(No Model.)

J. K. PUMPELLY.
CONNECTOR FOR SECONDARY BATTERIES.

No. 434,199. Patented Aug. 12, 1890.

Witnesses,
J. F. Mann,
Frederick F. Goodurn

Inventor,
James K. Pumpelly
By, Offield & Towle Attys

UNITED STATES PATENT OFFICE.

JAMES K. PUMPELLY, OF CHICAGO, ILLINOIS, ASSIGNOR TO D'ESTAING S. COVERT, OF SAME PLACE.

CONNECTOR FOR SECONDARY BATTERIES.

SPECIFICATION forming part of Letters Patent No. 434,199, dated August 12, 1890.

Application filed March 19, 1889. Serial No. 303,893. (No model.)

*To all whom it may concern:*

Be it known that I, JAMES K. PUMPELLY, of Chicago, Illinois, have invented certain new and useful Improvements in Connectors for Storage-Batteries, of which the following is a specification.

My invention relates to couplings or connectors for storage-batteries, &c.; and it consists, essentially, in a coupling adapted to connect the common conductors of opposite series of plates in separate secondary or storage batteries, &c.

The invention further consists in certain novel features of construction hereinafter described and claimed.

Figure 1:
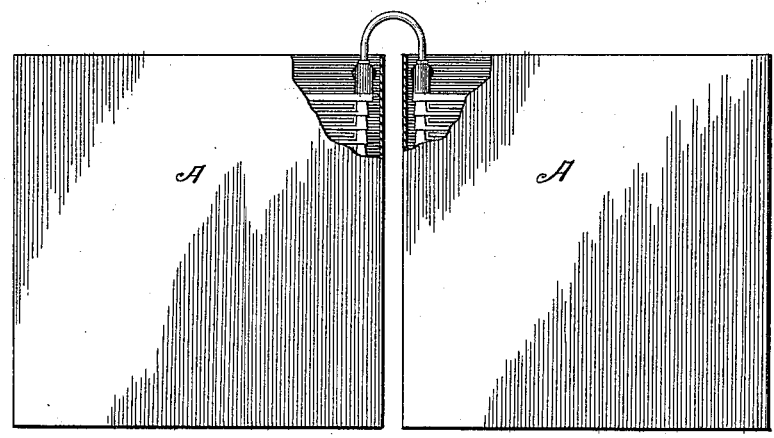
Figure 2:
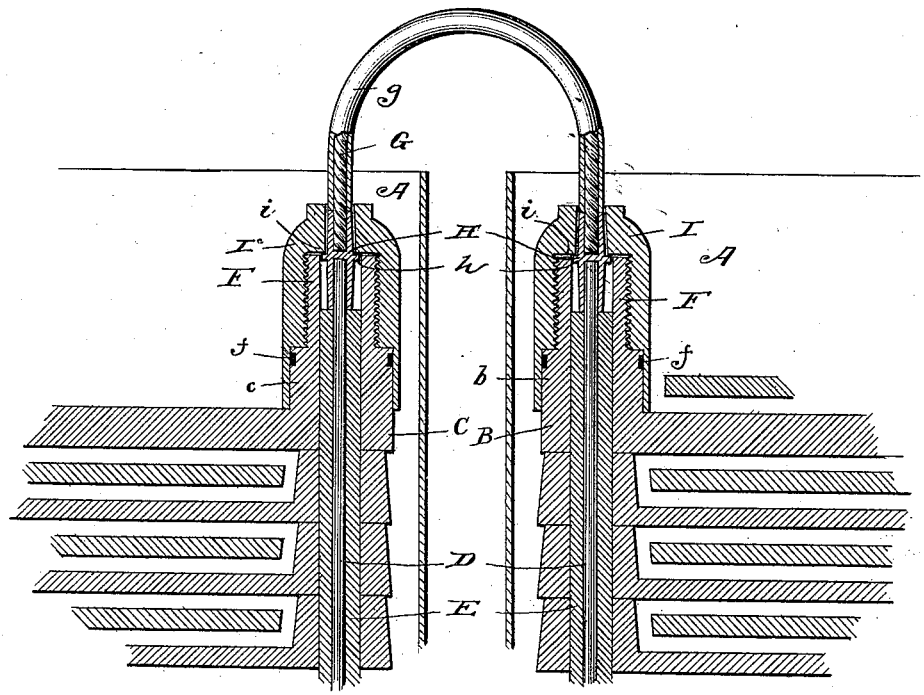

In the accompanying drawings, Figure 1 is a view in side elevation of two secondary or storage batteries in which the electrodes are arranged horizontally, a fragmentary portion of the exterior casing broken away to show the connector. Fig. 2 is a sectional elevation taken in the vertical plane of the lugs of the electrodes, the connector consisting in this instance of a flexible cable joined by metallic couplings to the common conductors of the separate batteries, the coupling being shown in section and the cable and common conductors in side elevation.

In said drawings, A represents the exterior casings of the batteries, B the positive and C the negative electrodes of the respective batteries, and $b$ $c$ their respective lugs. These lugs have within their hollows common conductors formed, in the construction shown in Fig. 2, by the core of copper wire D, which is surrounded by the lead envelope E. In this construction the lugs of the top electrode of each battery are screw-threaded, as shown at F, and an annular packing of rubber $f$ is secured in a groove in the periphery of each of said lugs below its threaded portion to prevent the penetration of the acid.

G is a connector, formed of copper wire cabled together, as shown. In the form of construction shown in the drawings, Figs. 1 and 2, its ends are secured within the hollow of a double metallic ferrule H, which latter receives also the upper end of the wire D. The ferrule H is provided with the flange $h$, and a coupling-sleeve I, having interior threads to adapt it for connection with the threaded lug of the top plate, has a shoulder $i$, which engages the flange $h$, whereby to prevent the withdrawal of the ferrule from the wire D. The lower end of the sleeve I is extended to surround the lug below the threads and bears upon the annular packing $f$. By preference the cable G has an insulating-casing $g$. Only one of the ends of the coupler need be adapted for removal.

I do not limit my invention to the precise construction herein shown and described, as it is obvious that changes in the structural features may be made without departing from the spirit of my invention.

I claim—

The combination, with storage-batteries, each having a series of electrodes, and one at least of the batteries having its uppermost electrode provided with an integral lug, screw-threaded on its exterior, of a connector for the batteries, comprising a flexible cable and a hollow sleeve loosely surrounding one end of the cable and having its interior threaded to adapt it for threaded connection with the threaded lug, substantially as described.

JAMES K. PUMPELLY.

Witnesses:
FREDERICK C. GOODWIN,
C. C. LINTHICUM.